United States Patent
Podgorny et al.

(10) Patent No.: US 10,268,956 B2
(45) Date of Patent: Apr. 23, 2019

(54) METHOD AND SYSTEM FOR APPLYING PROBABILISTIC TOPIC MODELS TO CONTENT IN A TAX ENVIRONMENT TO IMPROVE USER SATISFACTION WITH A QUESTION AND ANSWER CUSTOMER SUPPORT SYSTEM

(71) Applicant: Intuit Inc., Mountain View, CA (US)

(72) Inventors: Igor A. Podgorny, San Diego, CA (US); Benjamin John Koonse, Del Mar, CA (US)

(73) Assignee: Intuit Inc., Mountain View, CA (US)

( * ) Notice: Subject to any disclaimer, the term of this patent is extended or adjusted under 35 U.S.C. 154(b) by 924 days.

(21) Appl. No.: 14/814,765

(22) Filed: Jul. 31, 2015

(65) Prior Publication Data
US 2017/0032251 A1 Feb. 2, 2017

(51) Int. Cl.
*G06F 15/18* (2006.01)
*G06N 5/02* (2006.01)
(Continued)

(52) U.S. Cl.
CPC ........... *G06N 5/022* (2013.01); *G06Q 30/016* (2013.01); *G06Q 40/123* (2013.12)

(58) Field of Classification Search
CPC ............................................... G06F 17/30864
(Continued)

(56) References Cited

U.S. PATENT DOCUMENTS 5,471,382 A 11/1995 Tallman et al.
5,519,608 A 5/1996 Kupiec
(Continued)

FOREIGN PATENT DOCUMENTS

| CN | 101520802 | 4/2009 |
|---|---|---|
| EP | 2159715 | 3/2010 |
| WO | WO 2011/053830 | 5/2011 |

OTHER PUBLICATIONS

Dror, et al., "From Query to Question in One Click: Suggesting Synthetic Questions to Searchers," World Wide Web, International World Wide Web Conferences Steering Committee, Republic and Canton of Geneva, Switzerland; May 13, 2013, pp. 391-402.

(Continued)

*Primary Examiner* — David R Vincent
(74) *Attorney, Agent, or Firm* — Hawley Troxell Ennis & Hawley LLP; Philip McKay

(57) ABSTRACT

A method and system applies a probabilistic topic model to content in a tax environment to improve user satisfaction with a question and answer customer support system, according to one embodiment. The probabilistic topic model may be the Latent Dirichlet allocation algorithm or other implementations of probabilistic topic models, according to various embodiments. The method and system include receiving submission content from a user, according to one embodiment. The method and system include applying a probabilistic topic model to the submission content to determine submission content topics and submission content statistics, according to one embodiment. The method and system include generating and providing customer support content at least partially based on the submission content topics and at least partially based on the submission content statistics, to facilitate use of the question and answer customer support system by the user, according to one embodiment.

40 Claims, 9 Drawing Sheets

(51) Int. Cl.
    *G06Q 40/00* (2012.01)
    *G06Q 30/00* (2012.01)
(58) Field of Classification Search
    USPC .............................................. 706/12, 15, 45
    See application file for complete search history.

(56) References Cited

U.S. PATENT DOCUMENTS

| | | | |
|---|---|---|---|
| 6,147,975 A | 11/2000 | Bowman-Amuah | |
| 6,601,055 B1 | 7/2003 | Roberts | |
| 7,013,263 B1 | 3/2006 | Isaka et al. | |
| 7,222,078 B2 | 5/2007 | Abelow | |
| 7,385,716 B1 | 6/2008 | Skaanning | |
| 7,594,176 B1 | 9/2009 | English | |
| 7,685,144 B1 | 3/2010 | Katragadda | |
| 7,974,860 B1 | 7/2011 | Travis | |
| 8,200,527 B1 | 6/2012 | Thompson et al. | |
| 8,341,167 B1 | 12/2012 | Podgorny et al. | |
| 8,645,298 B2 | 2/2014 | Hennig et al. | |
| 8,943,145 B1 | 1/2015 | Peters et al. | |
| 8,983,977 B2 | 3/2015 | Ishikawa et al. | |
| 9,015,031 B2 | 4/2015 | Ferrucci et al. | |
| 9,063,983 B1 | 6/2015 | Lee | |
| 9,336,211 B1 | 5/2016 | Bousquet et al. | |
| 9,342,608 B2 | 5/2016 | Cook et al. | |
| 9,460,191 B1 | 10/2016 | Gaucher et al. | |
| 9,582,757 B1 | 2/2017 | Holmes et al. | |
| 9,633,309 B2 | 4/2017 | Giffels et al. | |
| 9,887,887 B2 | 2/2018 | Hunter et al. | |
| 9,892,367 B2 | 2/2018 | Guo et al. | |
| 9,910,886 B2 | 3/2018 | Adams, Jr. et al. | |
| 2002/0111888 A1 | 8/2002 | Stanley et al. | |
| 2002/0111926 A1 | 8/2002 | Bebie | |
| 2002/0123983 A1 | 9/2002 | Riley et al. | |
| 2002/0169595 A1 | 11/2002 | Agichtein et al. | |
| 2003/0099924 A1 | 5/2003 | Tsuboi et al. | |
| 2004/0024739 A1 | 2/2004 | Copperman et al. | |
| 2005/0114327 A1 | 5/2005 | Kumamoto et al. | |
| 2006/0265232 A1 | 11/2006 | Katariya et al. | |
| 2007/0011131 A1 | 1/2007 | Delefevre | |
| 2007/0219863 A1 | 9/2007 | Park et al. | |
| 2007/0259325 A1 | 11/2007 | Clapper | |
| 2008/0189197 A1 | 8/2008 | Allanson et al. | |
| 2008/0215541 A1 | 9/2008 | Li et al. | |
| 2008/0294637 A1 | 11/2008 | Liu | |
| 2009/0012926 A1 | 1/2009 | Ishikawa et al. | |
| 2009/0119575 A1 | 5/2009 | Velusamy | |
| 2009/0162824 A1 | 6/2009 | Heck | |
| 2009/0248659 A1 | 10/2009 | McCool et al. | |
| 2009/0253112 A1 | 10/2009 | Cao et al. | |
| 2009/0265340 A1 | 10/2009 | Barcklay et al. | |
| 2010/0068687 A1 | 3/2010 | Bertelsen | |
| 2010/0070554 A1 | 3/2010 | Richardson et al. | |
| 2010/0076998 A1 | 3/2010 | Podgorny et al. | |
| 2010/0088262 A1 | 4/2010 | Visel et al. | |
| 2010/0185630 A1 | 7/2010 | Cheng et al. | |
| 2010/0191686 A1 | 7/2010 | Wang et al. | |
| 2010/0203492 A1 | 8/2010 | Nibe et al. | |
| 2010/0205550 A1 | 8/2010 | Chen et al. | |
| 2010/0235361 A1 | 9/2010 | Chandran et al. | |
| 2010/0318919 A1 | 12/2010 | Murphy et al. | |
| 2011/0055699 A1* | 3/2011 | Li | G06F 17/30864 715/709 |
| 2011/0125734 A1 | 5/2011 | Duboue et al. | |
| 2011/0202472 A1 | 8/2011 | Wan et al. | |
| 2011/0231347 A1 | 9/2011 | Xu et al. | |
| 2011/0264569 A1 | 10/2011 | Houseworth et al. | |
| 2011/0282892 A1 | 11/2011 | Castellani et al. | |
| 2012/0005148 A1 | 1/2012 | Horvitz et al. | |
| 2012/0005219 A1 | 1/2012 | Apacible et al. | |
| 2012/0022983 A1 | 1/2012 | Hughes et al. | |
| 2012/0084185 A1 | 4/2012 | Ciaramitaro et al. | |
| 2012/0084293 A1 | 4/2012 | Brown et al. | |
| 2012/0130910 A1 | 5/2012 | Al-Alami | |
| 2012/0130978 A1 | 5/2012 | Li et al. | |
| 2012/0136764 A1 | 5/2012 | Miller et al. | |
| 2012/0166438 A1 | 6/2012 | Wu et al. | |
| 2012/0219142 A1 | 8/2012 | Gould | |
| 2012/0233191 A1 | 9/2012 | Ramanujam | |
| 2012/0331052 A1 | 12/2012 | Rathod | |
| 2013/0019286 A1 | 1/2013 | Barborak et al. | |
| 2013/0054497 A1 | 2/2013 | Garland et al. | |
| 2013/0066693 A1 | 3/2013 | Laird-McConnell et al. | |
| 2013/0073390 A1 | 3/2013 | Konig et al. | |
| 2013/0117677 A1 | 5/2013 | St. Jacques, Jr. | |
| 2013/0282363 A1 | 10/2013 | Fan et al. | |
| 2013/0297553 A1 | 11/2013 | Bierner | |
| 2013/0304730 A1 | 11/2013 | Zhou | |
| 2013/0325992 A1 | 12/2013 | McGann et al. | |
| 2013/0339870 A1 | 12/2013 | Tandra Sishtla et al. | |
| 2014/0006012 A1 | 1/2014 | Zhou et al. | |
| 2014/0088944 A1 | 3/2014 | Natarajan et al. | |
| 2014/0119531 A1 | 5/2014 | Tuchman et al. | |
| 2014/0172883 A1 | 6/2014 | Clark et al. | |
| 2014/0189829 A1 | 7/2014 | McLachlan et al. | |
| 2014/0201045 A1 | 7/2014 | Pai et al. | |
| 2014/0222669 A1 | 8/2014 | Novak et al. | |
| 2014/0280070 A1 | 9/2014 | George et al. | |
| 2014/0308648 A1 | 10/2014 | Jain | |
| 2014/0316856 A1 | 10/2014 | Williams et al. | |
| 2014/0324856 A1 | 10/2014 | Lahiani et al. | |
| 2014/0337257 A1 | 11/2014 | Chatterjee et al. | |
| 2014/0372980 A1 | 12/2014 | Verma et al. | |
| 2015/0052087 A1 | 2/2015 | Srinivasan et al. | |
| 2015/0095267 A1 | 4/2015 | Behere et al. | |
| 2015/0120718 A1 | 4/2015 | Luo et al. | |
| 2015/0127587 A1 | 5/2015 | Pinckney et al. | |
| 2015/0139415 A1 | 5/2015 | Skiba et al. | |
| 2015/0254785 A1 | 9/2015 | Yang | |
| 2015/0324805 A1 | 11/2015 | Skiba et al. | |
| 2015/0371137 A1 | 12/2015 | Giffels et al. | |
| 2016/0048772 A1 | 2/2016 | Bruno et al. | |
| 2016/0055234 A1 | 2/2016 | Visotski et al. | |
| 2016/0103833 A1 | 4/2016 | Sanders et al. | |
| 2016/0148321 A1 | 5/2016 | Ciaramitaro et al. | |
| 2016/0180470 A1 | 6/2016 | Mascaro et al. | |
| 2016/0189029 A1 | 6/2016 | Giffels et al. | |
| 2016/0196497 A1 | 7/2016 | Allen et al. | |
| 2016/0217472 A1 | 7/2016 | Podgorny et al. | |
| 2016/0283491 A1 | 9/2016 | Lu et al. | |
| 2016/0306846 A1 | 10/2016 | Adams, Jr. et al. | |
| 2017/0024424 A1 | 1/2017 | Almohizea | |
| 2017/0032251 A1 | 2/2017 | Podgorny et al. | |
| 2017/0032468 A1 | 2/2017 | Wang et al. | |
| 2017/0124184 A1 | 5/2017 | Podgorny et al. | |
| 2017/0270159 A1 | 9/2017 | Wang et al. | |
| 2018/0032890 A1 | 2/2018 | Podgorny et al. | |
| 2018/0089283 A1 | 3/2018 | Indyk et al. | |
| 2018/0108092 A1 | 4/2018 | Goodyear et al. | |
| 2018/0108093 A1 | 4/2018 | Podgorny et al. | |
| 2018/0113935 A1 | 4/2018 | George et al. | |

OTHER PUBLICATIONS

The Scientific Marketer, "Uplift Modelling FAQ", article date of Sep. 27, 2007, retrieved from http://scientificmarketer.com/2007/09/uplift-modelling-faq.html (Year: 2007).

Podgorny, et al. "Real Time Detection and Intervention of Poorly Phrased Questions," CHI EA '15, Proceedings of the 33$^{rd}$ Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL:https://getsatisfaction.com/corp>.

Bartolome et al., "Processing Unstructured Voice of Customer Feedback for Improving Customer Rankings in Customer Support Systems," U.S. Appl. No. 15/094,653, filed Apr. 8, 2016.

Podgorny, et al., "Content Quality and User Ranking in TurboTax AnswerXchange," Proceedings of the European Conference on Social Media, University of Brighton UK, Jul. 10-11, 2014.

(56) References Cited

OTHER PUBLICATIONS

Zadeh, Z.; "Probabilistic Modeling in Community-Based Question Answering Services;" Dalhousie University, Halifax, Nova Scotia; Feb. 2012.

* cited by examiner

| Topic 18 – 346 views | | Topic 27 – 50 views | |
|---|---|---|---|
| TERM | FREQ | TERM | FREQ |
| filed | 0.1509 | year | 0.4452 |
| IRS | 0.1292 | last | 0.1929 |
| already | 0.0946 | credit | 0.1418 |
| yet | 0.0589 | qualify | 0.0447 |
| accepted | 0.0585 | EIC | 0.0186 |
| going | 0.042 | 2010 | 0.0182 |
| saying | 0.033 | eligible | 0.017 |
| else | 0.0237 | American | 0.0137 |
| website | 0.0223 | opportunity | 0.0108 |
| site | 0.0217 | law | 0.0101 |

FIG. 3A

| Topic 32 – 82.5% up vote | | Topic 6 – 46.8% up vote | |
|---|---|---|---|
| TERM | FREQ | TERM | FREQ |
| claim | 0.2185 | can't | 0.1128 |
| dependent | 0.0841 | error | 0.0688 |
| child | 0.0694 | address | 0.0528 |
| son | 0.0585 | fix | 0.0431 |
| daughter | 0.0387 | delete | 0.0381 |
| claimed | 0.0359 | page | 0.0375 |
| care | 0.033 | problem | 0.0347 |
| support | 0.0314 | tried | 0.0307 |
| claiming | 0.0239 | keeps | 0.0236 |
| children | 0.0237 | continue | 0.0222 |

FIG. 3B 400    401

| intuit. LC Local | Sign In |

Search the community... 🔍

| All Questions | Answered  Unanswered | Sort: Latest Activity ▼ | Topics |

Cray plaid wayfarers yr
Twee flannel vinyl, drinking vinegar photo booth fingerstache bitters cray kale chips before they sold out...
&Admin • TurboTax Home & Biz • ⟲ 101 answers • last activity 21 days ago totesfasdfasf adfa sdfasfdasf
adsfsdf
&magotes • asked 25 days ago Meggings Schlitz High Life paleo Terry Richardson cornhole
Gentrify wolf disrupt food truck cred Terry Richardson aesthetic twee gluten-free hashtag. PBR Pintrest...
&Admin • TurboTax Home & Biz• ⊚2 people have this question• ✓1 answer• asked 5 months ago this si a dafasdf afd asfd as fdsa f
&magotes • asked 6 months ago adafasdf a dfadfasdfas asd fafdsadssdfd asdfasdf
&magotes • asked 4 months ago adafasdf a dfadfasdfas asd fafdsadssdfd asdfasdf
&magotes • last activity 7 months ago adffadsfsadf adsf adsfasdfasdfdf asdfasdfsdafs
&magotes • asked 4 months ago adfadf as fa sdfas dfa adf sa fsddsfdf
&magotes • asked 5 months ago afddsaf a fdad sf asdf asd fa sf asdfa
&magotes • asked 7 months ago dude totes wtf hell
&magotes • asked 5 months ago fafasdf fa df ad f adf ad sdaf as fasdfsdf
&magotes • asked 5 months ago adfasdf adfasdf adfasdf adfasdf
&magotes • asked 4 months ago

Topics
Problem – Tax Return (6)
Filing Status (13)
Deductions & Expenses (16)
Forms & Interview (7)
Investments (17)
Account & Payments (1)
Income – Reporting (18)
Completing Return (17)
How to Import (1)
Income – General (5)
Personal Info (10)
Business & Rentals (4)
Income – TurboTax (18)
Home & Deductions (18)
W-2 & Estimated tax (17)
Scedules (8)
State & Federal Taxes (10)
Problem – E-File (14)
IRAs (15)
Deductions & Dependents (16)
Problem – TurboTax (5)
How to Enter (17)
Address & Moving (17)
Credits (7)
Past Year Returns (20)
TurboTax Version (12)
Income – Additional (9)
Dependents (18)
States (17)
Refund (10)

View all >

FIG. 4A

METHOD AND SYSTEM FOR APPLYING PROBABILISTIC TOPIC MODELS TO CONTENT IN A TAX ENVIRONMENT TO IMPROVE USER SATISFACTION WITH A QUESTION AND ANSWER CUSTOMER SUPPORT SYSTEM

BACKGROUND

Software applications and systems have become indispensable tools for helping consumers, i.e., users, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

One major, if not determinative, factor in the utility, and ultimate commercial success, of a given software system of any type is the ability to implement and provide a customer support system through which a given user can obtain assistance and, in particular, get answers to questions that arise during the installation and operation of the software system. However, providing potentially millions of software system users with specialized advice and answers to their specific questions is a huge undertaking that can easily, and rapidly, become economically infeasible.

To address this problem, many providers of software systems implement or sponsor one or more question and answer based customer support systems. Typically, a question and answer based customer support system includes a hosted forum through which a user can direct their specific questions, typically in a text format, to a support community that often includes other users and/or professional support personal.

In many cases, once a user's specific question is answered by one or more members of the support community through the question and answer based customer support system, the user's specific question, and the answer to the specific question provided by the support community, is categorized and added to a customer support question and answer database associated with the question and answer based customer support system. In this way, subsequent users of the software system can access the user's specific question or topic, and find the answer to the user's question, via a search of the customer support question and answer database. As a result, a dynamic customer support question and answer database of categorized/indexed user questions and answers is made available to users of the software system through the question and answer based customer support system.

The development of customer support question and answer databases has numerous advantages including a self-help element whereby a searching user, i.e., a user accessing the resulting question and answer pair, can find an answer to their particular question by simply searching the customer support question and answer database for topics, questions, and answers related to their issue. In addition, if the answer to the user's specific question is not in the customer support question and answer database, the user can then become an asking user by submitting their question to the question and answer based customer support system, typically through the same web-site and/or user interface. Consequently, by using a question and answer based customer support system that includes a customer support question and answer database, potentially millions of user questions can be answered in an efficient and effective manner, and with minimal duplicative effort.

The content that users are exposed to, within the question and answer based customer support system, may affect the reputation of the service provider of the question and answer based customer support system. If users' queries consistently are directed to answers and/or questions that are unsatisfactory, the users will communicate dissatisfaction by, for example, using competitor question and answer systems, providing negative reviews in forums, and avoiding other products that are available from the service provider. Furthermore, the more dissatisfied users are with answers found in the question and answer based customer support system, the more likely the users are to request live customer support. This is financially undesirable for a service provider because providing live customer support, such as telephone call and web chats, is significantly more expensive than maintaining a database of answers provided by a support community (e.g., provided at least partially by volunteers).

What is needed is a method and system for an automated content categorization system in a tax environment to improve user satisfaction with a question and answer customer support system.

SUMMARY

Embodiments of the present disclosure address some of the shortcomings associated with traditional question and answer based customer support systems for applying probabilistic topic models to content in a tax environment to improve user satisfaction with a question and answer customer support system, according to one embodiment. By improving user satisfaction with the question and answer customer support system, the production environment assists the service provider in achieving business objectives such as, but not limited to, converting potential customers into paying customers of other services; reducing costs associated with user requests for live customer assistance; and attracting/directing/introducing new potential customers to products offered by the service provider, according to one embodiment.

The question and answer customer support system uses the probabilistic topic models to analyze various types of submission content, which can originate from different types of users, in order to generate various types of customer support content to facilitate and/or improve the user experience in the question and answer customer support system, according to one embodiment. Probabilistic topic models extract hidden topics or summaries from content objects (e.g., database entries, webpages, in documents), without requiring the training of the model with known (e.g., manually verified) data sets, according to one embodiment. The submission content can include question content (e.g., a question), response content (e.g., a comment or an answer to a question), and search query content (e.g., from a searching user), according to one embodiment. The question and answer customer support system applies a probabilistic topic model to the submission content to generate customer support content such as, but not limited to, recommendations for improving question content, recommendations for improving response content, question quality indicators, question popularity indicators, answer quality indicators, answer popularity indicators, categorization of question content as product-related or tax-related, topically categorized navigation interfaces, and topically categorized search results, according to various embodiments. By applying probabilistic topic models to content in the tax environment, the question and answer customer support system facilitates/enables: asking users to submit high-quality questions that result in more satisfying responses; asking users to submit popular questions, which can increase the likelihood that searching users will be directed to high-quality content; responding users to receive question content that is related to the responding users' particular areas of expertise (e.g., product-related topics or tax-related topics); and searching users to receive topically categorized and/or relevance-sorted search results in response to submission of search query content, according to various embodiments. In one embodiment, the probabilistic topic model that is applied to content in the tax environment is a Latent Dirichlet allocation ("LDA") algorithm or another version of a probabilistic topic model.

These and other embodiments are disclosed in more detail below.

The disclosed method and system for applying probabilistic topic models to content in a tax environment to improve user satisfaction with a question and answer customer support system, provides for significant improvements to the technical fields of customer support, information dissemination, software implementation, and user experience. In addition, using the disclosed method and system for applying probabilistic topic models to content in a tax environment results in more efficient use of human and non-human resources, fewer processor cycles being utilized, reduced memory utilization, and less communications bandwidth being utilized to relay data to and from backend systems because users are less likely to request live customer support and because improving question quality and popularity results in users being directed to questions that are likely to result in user satisfaction and result in fewer additional question submissions. As a result, computing systems are transformed into faster, more efficient, and more effective computing systems by implementing the method and system for applying probabilistic topic models to content in a tax environment to improve user satisfaction with a question and answer customer support system.

BRIEF DESCRIPTION OF THE DRAWINGS

FIGS. 3A, 3B, and 3C are illustrative example tables and a graph showing relationships between topic content, question popularity, and question quality, determined by applying a probabilistic topic model to a sample data set in accordance with one embodiment;

FIGS. 4A and 4B are illustrate example user experience displays having topics and search results that are selected and sorted based on the application of a probabilistic topic model to a sample data set in accordance with one embodiment;

Figure 1:
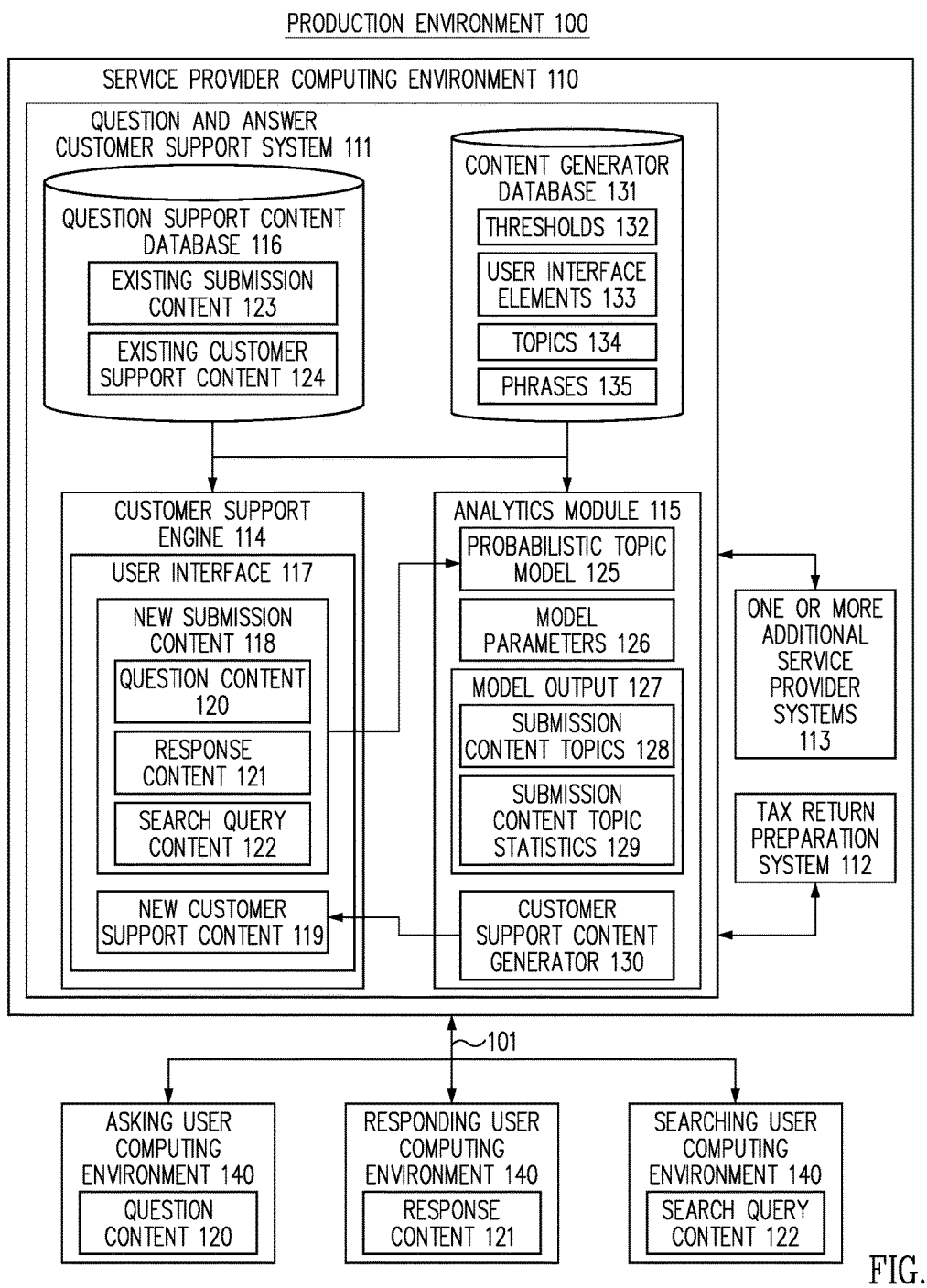
FIG. 1 is a block diagram representing one example of a hardware system and production environment for applying probabilistic topic models to content in a tax environment to improve user satisfaction with a question and answer customer support system in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

Term Definitions

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "question quality indicator" includes any mechanism, means, or feature/function provided to indicate to a user a determined quality of a question being provided by the user. Specific examples of question quality indicators include, but are not limited to, meter displays; line displays; score displays; audio content; visual content; images; backgrounds; avatars; highlighting mechanisms; icons; and any other features that individually, or in combination, relay to a user a determined quality of a question being submitted.

As used herein, the term "question popularity indicator" includes any mechanism, means, or feature/function provided to indicate to a user a determined/estimated popularity of a question being provided by the user. Specific examples of question popularity indicators include, but are not limited to, meter displays; line displays; score displays; audio content; visual content; images; backgrounds; avatars; highlighting mechanisms; icons; and any other features that individually, or in combination, relay to a user a determined, estimated, or predicted quality of a question being submitted.

Herein, the term "party," "user," "user consumer," and "customer" are used interchangeably to denote any party and/or entity that interfaces with, and/or to whom information is provided by, the method and system for determining a level of popularity of submission content, prior to publicizing the submission content with a question and answer support system as described herein, and/or a person and/or entity that interfaces with, and/or to whom information is provided by, the method and system for determining a level of popularity of submission content, prior to publicizing the submission content with a question and answer support system as described herein, and/or a legal guardian of person and/or entity that interfaces with, and/or to whom information is provided by, the method and system for determining a level of popularity of submission content, prior to publicizing the submission content with a question and answer support system as described herein, and/or an authorized agent of any party and/or person and/or entity that interfaces with, and/or to whom information is provided by, the method and system for determining a level of popularity of submission content, prior to publicizing the submission content with a question and answer support system as described herein. For instance, in various embodiments, a user can be, but is not limited to, a person, a commercial entity, an application, a service, and/or a computing system.

As used herein, the term "asking user" includes a user of a software system submitting submission content (e.g., a question) to a question and answer based customer support system.

As used herein, the term "searching user" includes a user of a software system submitting a search query to a customer support question and answer database associated with a question and answer customer support system. An "answer recipient" includes one or both of the "asking user" and the "searching user", according to one embodiment.

As used herein, the term "responding user" includes a user of a software system who submits a response to submission content for the question and answer based customer support system. In one embodiment, the term "response" is interchangeably used with the term "reply", and the term "responding user" is interchangeably used with the term(s) "replying user" and/or "answering user". In one embodiment, a "responding user", "replying user", and/or "answering user" is a user who submits an answer to submission content (e.g., a question) and/or one who submits a comment to submission content in the question and answer based customer support system.

As used herein, submission content includes a question content (inclusive of question summary and question details), response content, and search query content and the term "submission content" is used interchangeably with the term "question". A question summary is a character limited summary or articulation of the question, and the question details are additional information about the user or the circumstances surrounding the question summary. As used herein, a "post" is used to refer to a publicized or published version of the submission content, and may include comments and/or answers submitted by users in response to publicizing, publishing, hosting, and/or posting the submission content. Although submission content and a post may include similar information, one references content that has not been made publically available by a question and answer customer support system and the other has been made available for review, response, and comment by the public.

As used herein, the term "probabilistic topic model" or "probabilistic model" denotes one or more individual or combined algorithms or sets of equations that describe, determine, or predict characteristics of or the performance of a datum, a data set, multiple data sets, data objects, a computing system, and/or multiple computing system. The probabilistic topic model include algorithms configured to discover the hidden thematic (or semantic) structure in large data objects, text, and archives of documents.

DETAILED DISCLOSURE

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

FIG. 1 illustrates a block diagram of a production environment 100 for applying probabilistic topic models to content in a tax environment to improve user satisfaction with a question and answer customer support system, according to one embodiment. By improving user satisfaction with the question and answer customer support system, the production environment assists the service provider in achieving business objectives such as, but not limited to, converting potential customers into paying customers of other services; reducing user requests for live customer assistance; and attracting/directing/introducing new potential customers to products offered by the service provider, according to one embodiment. Probabilistic topic models extract hidden topics or extract content summaries from content objects (e.g., database entries, webpages, in documents), without requiring the training of the model with known (e.g., manually verified) data sets, according to one embodiment. The hidden topics or content summaries can then be labeled by system administrators or other users, based on the terms returned from the model for the hidden topics or content summaries, according to one embodiment. The production environment 100 uses the probabilistic topic models to analyze various types of submission content, which can originate from different types of users, in order to generate various types of customer support content to facilitate and/or improve the user experience in the question and answer customer support system, according to one embodiment. The submission content can include question content (e.g., a question), response content (e.g., a comment or an answer to a question), and search query content, according to one embodiment. The production environment 100 applies a probabilistic topic model to the submission content to generate a customer support content such as, but not limited to, recommendations for improving question content, recommendations for improving response content, question quality indicators, question popularity indicators, answer quality indicators, answer popularity indicators, categorization of question content as product-related or tax-related, topically categorized navigation interfaces, topically categorized search results, and recommendations for improving a response, according to various embodiments. By applying probabilistic topic models to content in the tax environment, the production environment 100 facilitates/enables: asking users to submit high-quality questions that result in more satisfying responses; asking users to submit popular questions, which can increase the likelihood that searching users will be directed to high-quality content; responding users to receive question content that is related to the responding users' particular areas of expertise (e.g., product-related topics or tax-related topics); and searching users to receive topically categorized and/or relevance-sorted search results in response to submission of search query content, according to various embodiments. In one embodiment, the probabilistic topic model that is applied to content in the tax environment is a Latent Dirichlet allocation ("LDA") algorithm or another version of a probabilistic topic model.

The production environment 100 includes a service provider computing environment 110, an asking user computing environment 140, a responding user computing environment 145, and a searching user computing environment 150, according to one embodiment. The service provider computing environment 110 includes a question and answer customer support system 111 that is associated with and/or configured to support a tax return preparation system 112 and/or one or more additional service provider systems 113, according to one embodiment. The question and answer customer support system 111, the tax return preparation system 112, and the one or more additional service provider systems 113 are software systems, according to one embodiment. As noted above, herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems of the question and answer customer support system 111, the tax return preparation system 112, and the one or more additional service provider systems 113 include, but are not limited to the following: TurboTax AnswerXchange™ available from Intuit, Inc. of Mountain View, Calif.; TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

In one embodiment the question and answer customer support system 111, e.g., a social question and answer (Q&A) system, is provided to support users of the software system (e.g., the tax return preparation system 112 and/or one or more additional service provider systems 113).

The question and answer customer support system 111 includes a customer support engine 114, an analytics module 115, and a customer support content database 116 for applying probabilistic topic models to content in a tax environment to improve/maintain customer satisfaction with the question and answer customer support system 111, according to one embodiment.

The customer support engine 114 includes a user interface 117 for providing a user interface display that receives new submission content 118 from a user and that delivers new customer support content 119 to the user, according to one embodiment. The user interface 117 includes, but is not limited to one or more data entry fields; question quality indicators; images; backgrounds; avatars; highlighting mechanisms; icons; boxes; slides; buttons; and any other user interface elements or features that individually, or in combination, create a user experience, as discussed herein, and/or as known in the art at the time of filing, and/or as developed after the time of filing.

The customer support engine 114 uses the user interface 117 to receive different types of new submission content 118 from different types of users, according to one embodiment. The new submission content 118 includes question content 120, response content 121, and search query content 122, according to one embodiment. The question content 120 is received from an asking user through the asking user computing environment 140, the response content 121 is received from a responding user through the responding user computing environment 145, and the search query content 122 is received from a searching user through the searching user computing environment 150, according to one embodiment. In one embodiment, question and answer customer support system 111 is provided to support the tax return preparation system 112 and therefore the question content 120, the response content 121, and the search query content 122 are related to tax-related questions (e.g., federal and state taxation and tax preparation) and/or product-related questions (e.g., the installation and/or operations of the tax return preparation system 112), according to one embodiment. The question and answer customer support system 111 uses the customer support engine 114 and/or the user interface 117 to enable: asking users to submit question content 120 (e.g., questions); responding users to submit response content 121 (e.g., answers to questions); and searching users to submit search query content 122 (e.g., one or more search terms) to find answers to their questions that are already stored/maintained by the question and answer customer support system 111, according to one embodiment.

The customer support engine 114 uses the user interface 117 to provide different types of new customer support content 119 to the relevant type of user, e.g., asking user, responding user, searching user, etc., according to one embodiment. The new customer support content 119 is generated by the analytics module 115 and includes, but is not limited to, recommendations, indicators, user interface ("UI") elements, topics, and/or search results that facilitate/improve users' experience/interactions with the question and answer customer support system 111, according to one embodiment. Additional example embodiments of the new customer support content 119 will be described below after a discussion of embodiments of applying a probabilistic topic model to the new submission content 118 with the analytics module 115.

The customer support engine 114 updates the customer support content database 116 in response to receiving the new submission content 118 and/or the new customer support content 119, according to one embodiment. The customer support content database 116 includes existing submission content 123 (e.g., question content, response content, and search query content) and existing customer support content 124 (e.g., a history of recommendations and customer service provided to users), according to one embodiment. In other words, the customer support content database 116 stores and maintains one or more tables or other data structures of previously received questions, responses, comments, and search queries received from users of the question and answer customer support system 111, according to one embodiment. The customer support engine 114 updates the existing submission content 123 to reflect the new submission content 118, and the customer support engine 114 updates the existing customer support content 124 to reflect the new customer support content 119, according to one embodiment. The question and answer customer support system 111 publicizes the contents of the customer support content database 116 to enable users to submit question content, submit/review response content associated with the question content, submit search query content to find response content that is relevant to the user's current needs, and otherwise view and/or interact with content hosted by the question and answer customer support system 111, according to one embodiment.

The question content 120 submitted to the question and answer customer support system 111 can be related to very different broad categories, be of various question types, have varying predicted answer lengths, and be formatted in various different ways, according to one embodiment. The question content 120 includes a question summary (which provide a character-limited overview or description of the question), question details (which provide a non-character-limited description of the circumstances and/or background and/or context for the question summary, and user clickstream data (e.g., user IP address, web browsing history, geographical location, click speeds, hover durations, hardware identifier(s), and the like), according to one embodiment.

The response content 121 is provided by responding users who include paid support personnel in the employ of the service provider and volunteer experts, according to one embodiment. The response content 121 can include comments and answers to questions in the question content 120, according to one embodiment.

The search query content 122 includes one or more terms, phrases, or sentences used by searching users to search the question and answer customer support system for answers to product-related and/or substantive questions about the tax return preparation system 112 and/or the one or more additional service provider systems 113, according to one embodiment. The search query content 122 also includes other miscellaneous information about the searching user such as, but not limited to, the browsing history of the user, how the user arrived at the interface for the question and answer customer support system 111 (e.g., the landing page), the relationship of the user with the tax return preparation system 112 (e.g., system authenticated user, guest user, redirected user from search engine) and/or the one or more additional service provider systems 113, the IP address and/or geographic location of the user, and the like.

The customer support engine 114 receives the new customer support content 119, in response to providing the new submission content 118 to the analytics module 115 for processing with a probabilistic topic model 125, according to one embodiment. Probabilistic topic models are algorithms that processes text from a database elements, documents, files, and other content objects to determine topics, themes, and/or subjects of text-based content. The topic is a term/phrase for which the text-based content includes words having a high probability of relevance to the term/phrase, according to one embodiment. The probabilistic topic models populate a list, array, or other data structure with the topics of the text-based content, along with statistical information associated with the topics, according to one embodiment. The statistical information associated with the topics include, but are not limited to, quantity of occurrences, distribution of topics in the content, distribution of words in the topic, probability of a word occurring in a topic, probability of a topic occurring in the text-based content, and the like, according to various embodiments. In one embodiment, the probabilistic topic model 125 is the Latent Dirichlet allocation algorithm or another version of a probabilistic topic model.

The probabilistic topic model 125 receives the new submission content 118 and model parameters 126, to generate model output 127, according to one embodiment. The model parameters 126 include, but are not limited to, the number of topics for the probabilistic topic model 125 to generate and the number of iterations for the probabilistic topic model 125 to execute while processing the new submission content 118, according to one embodiment. The probabilistic topic model 125 can be configured to process hundreds, thousands, or tens of thousands of data samples, e.g., question and answer pairs with corresponding view and vote data, in a matter of hours, when a similar manual processing of the data samples might take weeks or months of manual human processing, according to one embodiment.

The model output 127 includes submission content topics 128 and submission content topic statistics 129, according to one embodiment. The submission content topics 128 are the terms/phrases for which the new submission content 118 includes words having a high probability of relevance to the terms/phrases, according to one embodiment. In one embodiment, submission content topics 128 are discrete portions of the new submission content 118 that provide quantifiable summaries of the submission content. The submission content topics 128 include the identity of a topic of a word in the new submission content 118, the identity of a topic of all words in the new submission content 118, the identity of a word in the new submission content 118, and/or the identity of all words and all more than one instance of submission content, according to one embodiment. The submission content topic statistics 129 include, but are not limited to, the probability of a word occurring in a topic, the distribution of words in a topic, the probability of a topic occurring in the new submission content 118 or in another text-based content, and/or the distribution of topics in the new submission content 118, according to one embodiment.

The analytics module 115 uses the customer support content generator 130 to generate different types of new customer support content 119, based on the model output 127 for the new submission content 118 and based on the content generator database 131, according to one embodiment. The customer support content generator 130 is configured to index, search, and/or rank the submission content topics 128 based at least partially on the submission content topic statistics 129 to determine which content from the content generator database 131 to use to populate the new customer support content 119, according to one embodiment. For example, the customer support content generator 130 may apply one or more thresholds 132 to the model output 127 to determine whether the question content 120 is estimated or predicted to receive enough votes to be deemed "popular". The customer support content generator 130 may display one or more user interface elements 133, such as meters, slides, digital displays, and the like to indicate a level of popularity and/or a level of quality of question content 120, according to one embodiment. The customer support content generator 130 may use topics 134 and/or phrases 135 to populate templates for recommendations, suggestions, and/or encouragement for a user to alter the question summary and/or the question details used in question content, according to one embodiment. Similarly, the customer support content generator 130 may use the thresholds 132, the user interface elements 133, the topics 134, and/or the phrases 135, to encourage or recommend that a responding user alter response content 121, according to one embodiment. The customer support content generator 130 may also use the contents of the content generator database 131 to display the submission content topics 128, based on the relevance of the search query content 122 to facilitate navigation of the user experience display for the user interface 117, according to one embodiment.

The analytics module 115 uses the customer support content generator 130 to generate new customer support content 119 that provides guidance to an asking user while the user is creating/generating the question content 120, according to one embodiment. In particular, the analytics module 115 can be configured to populate the new customer support content 119 with real-time recommendations for improving the quality and/or the popularity of the question content 120 that the asking user is creating. Because certain topics, words, question lengths, and question types of a question can determine the likelihood of user satisfaction with the answer to the question and can determine the likelihood of popularity (e.g., quantity of views) of a question, the customer support content generator 130 is configured to analyze model output 127 for the question content 120 and populate the new customer support content with one or more of a question quality indicator, a question popularity indicator, and/or recommendations for improving the quality and/or the popularity of the question content 120, according to one embodiment.

Figure 2A:
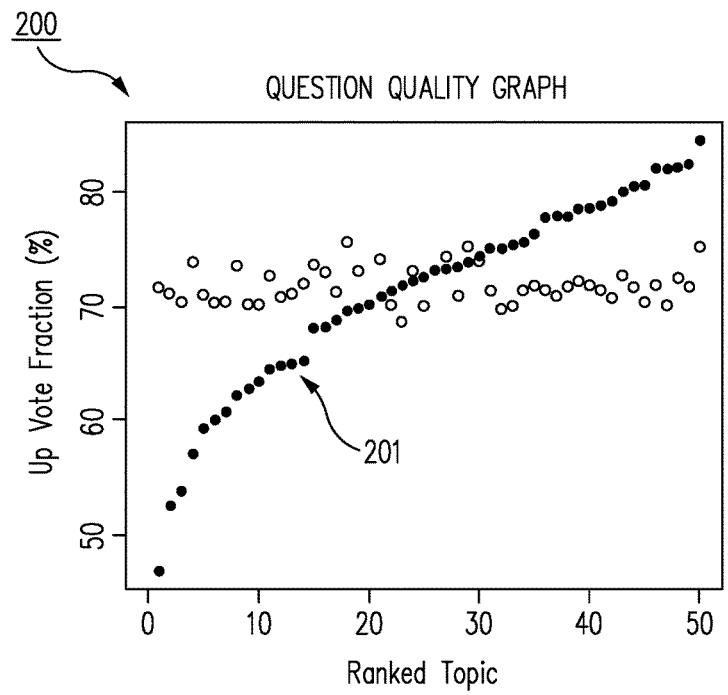
FIGS. 2A, 2B, and 2C are illustrative example graphs showing relationships between question quality and popularity for various topics that are determined by applying a probabilistic topic model to a sample data set in accordance with one embodiment.
Figure 2B:
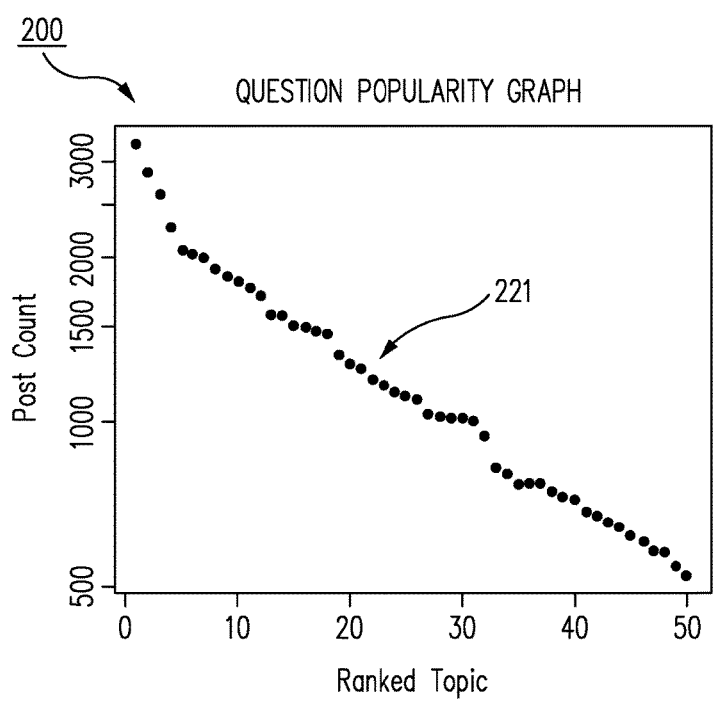
Figure 2C:
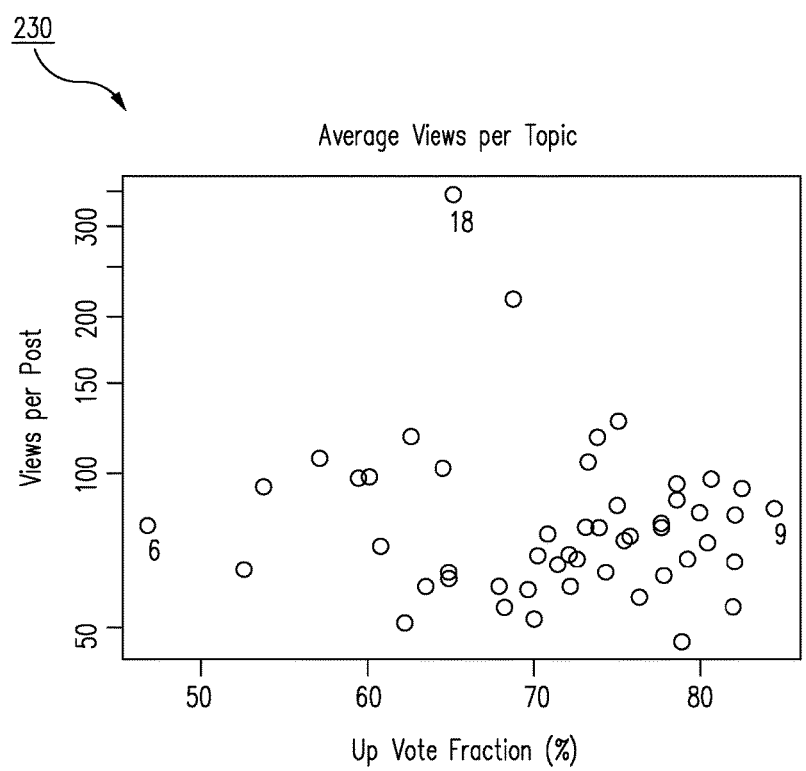

Briefly turning to FIGS. 2A, 2B, and 2C, FIG. 2A illustrates a question quality graph 200, FIG. 2B illustrates a question popularity graph 220, and FIG. 2C illustrates a question popularity and quality correlation graph 230, which are each generated by applying Latent Dirichlet allocation algorithm (an embodiment of the probabilistic topic model 125) to approximately 62,000 question content samples from 2013 (an embodiment of existing submission content 123). In particular, the Latent Dirichlet allocation algorithm was applied to question subjects and question details of the 62,000 question content to rank 50 topics within the question content samples based on the percentages of up votes received by each of the 50 topics and based on the quantity of posts made for each of the 50 topics. The question quality graph 200 includes an x-axis that identifies each one of 50 topics and a y-axis that identifies the percentage of up vote received for each of the 50 topics. The plot 201 includes the dark circles in the graph. The question popularity graph 220 includes an x-axis that identifies each one of 50 topics and a y-axis that identifies the number of posts, i.e., question submissions, made for each of the 50 topics. The plot 221 illustrates the relationship between the 50 topics and the number of posts made to a question and answer customer support system for each of the 50 topics. Each of the 50 topics (derived from the 62,000 questions) were manually evaluated, and the Latent Dirichlet allocation algorithm proved to be consistent with the findings that were manually determined by people. The question popularity and quality correlation graph 230 includes an x-axis that identifies the percentage of up vote for each of the 50 topics and a y-axis that identifies the views per post (i.e., an indication of popularity) for the 50 topics. As illustrated, there is very little correlation between the topics that users tend to up vote and the topics that receive above average views per post. Accordingly, the probabilistic topic model 125 can be used to predict question quality and question popularity separately, and can be used by the analytics module 115 to provide indicators and recommendations to the asking user to assist the asking user in strengthening the quality and/or the popularity of the question content formulated by the asking user, according to one embodiment. Because there is very little, if any, correlation between topics that receive up votes and topics that receive above average views per post, it may be unlikely for asking users to create both quality question content and popular question content without the assistance of the question and answer customer support system 111. In other words, it is just as likely for a user to create high-quality and very unpopular question content as it is for the user to create high-quality and very popular content. However, using the probabilistic topic model 125, the question and answer customer support system 111 can be configured to guide users to modify their question content so that it is likely to be of high-quality (e.g., receive customer satisfaction) and be popular (e.g., receive average or above average quantity of views), according to one embodiment.

Returning to FIG. 1, the analytics module 115 also uses the model output 127 to determine whether the question content 120 contains a predominantly product-related question or a predominantly tax-related question, to properly route the question content 120 to the type of responding user who can effectively generate satisfactory response content associated with the question content 120, according to one embodiment. For example, some questions submitted to the question and answer based customer support system are product-related questions, e.g., questions related to pricing, installation, version choice, etc. for the software systems that often have little or no relation to the subject matter/job of the software system, i.e., the endeavor supported by the software system. On the other hand, some questions submitted to the question and answer based customer support system are subject matter related, or substantive, questions directly related to the subject matter/endeavor of the software system.

As an illustrative example, in the case of a tax preparation software system, the questions "What version of the tax preparation software system should I use?" or "How do I install the tax preparation software system?" would be product-related questions while the questions "Can I deduct my computer?" or "What is my adjusted gross income?" would be subject matter related questions.

In general, product-related questions are best answered by paid support personnel in the employ of the provider of the software system while subject matter related questions are often best answered by volunteer expert users of the software system. Consequently, in one embodiment, the analytics module 115 uses the probabilistic topic model 125 to identify broad category/subject matter of the questions, e.g., product-related questions and subject matter related questions, to facilitate appropriately routing the questions to support personnel or volunteer expert users of the software system.

Figure 3C:
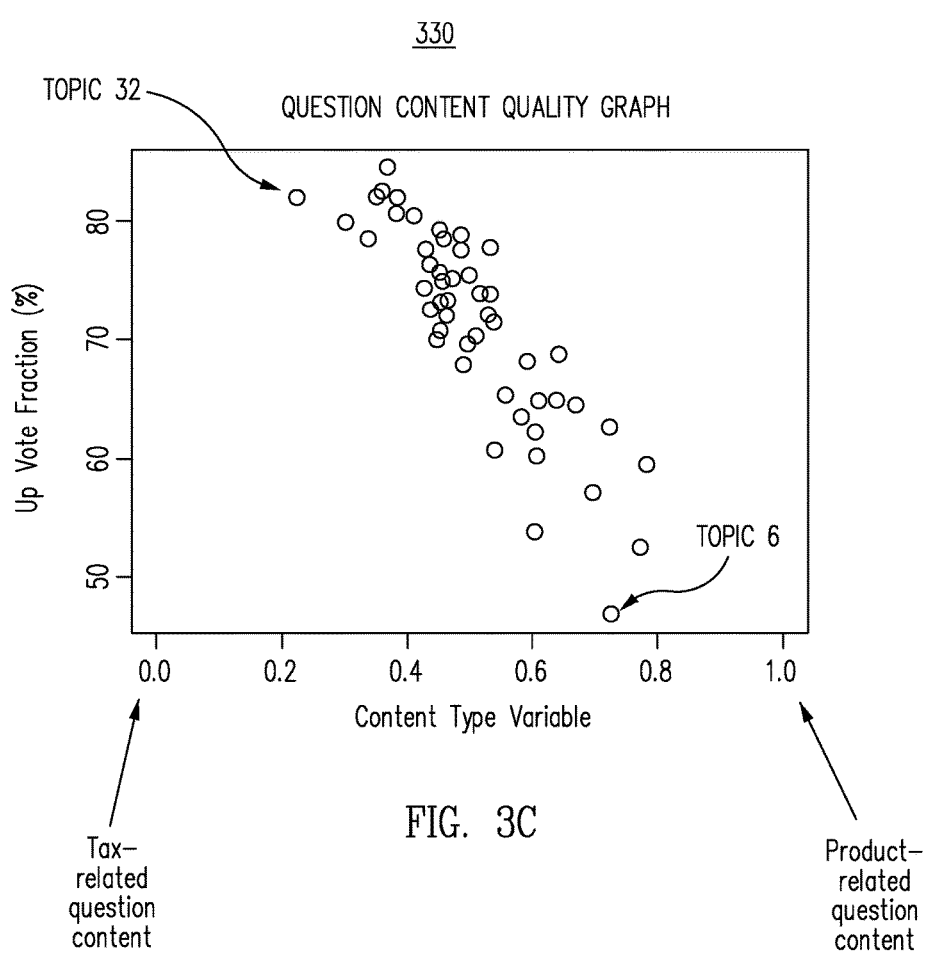

FIGS. 3A, 3B, and 3C illustrate example tables and a graph that demonstrate the effectiveness of applying the Latent Dirichlet allocation algorithm (i.e., an embodiment of the probabilistic topic model 125) to characterize the popularity and quality of topics based on whether the topic is predominantly a product-related question or predominantly a tax-related question. FIG. 3A includes a content type popularity table 300 illustrating results of applying the Latent Dirichlet allocation algorithm to a data set, and shows that topic 18 received more views than topic 27. The content type popularity table 300 includes columns of terms and frequency of the terms for each of the topics 18 and 27. The terms for topic 18 indicate that topic 18 predominantly includes product-related question content and is almost 7 times more popular than topic 27, which has terms that indicate the topic 27 permanently includes tax-related question content. One conclusion that can be drawn from the content type popularity table 300 is that procedure or product-related question content may be more popular than tax-related question content, according to one embodiment.

FIG. 3B includes a content type quality table 320 illustrating results of applying the Latent Dirichlet allocation algorithm to a data set, and the content type quality table 320 shows that topic 32 receives nearly twice the percentage of up votes (82.5%) as topic 6 (46.8%). As used herein, quality refers to customer satisfaction, as reflected in more up votes. The content type quality table 320 includes columns of terms and frequency of terms for each of the topics 32 and 6. The terms for topic 32 indicate that topic 32 predominantly includes tax-related question content and that the terms for topic 6 indicate that topic 6 predominately includes product-related question content. Although the tax-related question content of topic 32 received a significantly higher percentage of up votes than the product-related question content of topic 6, it may be difficult to conclude that the topic 32 was of higher quality than topic 6 because users tend to up vote tax-related content more than product-related content. Users therefore may be confusing quality of content (deserving of an up vote) with having to do their taxes or with the tax return preparation system (which may not have met the user's expectations).

FIG. 3C includes a question content quality graph 330, which indicates that tax-related question content receives a higher percentage of up votes than product-related question content. The question content quality graph 330 relies on the same 62,000 question content data set that is used to generate the graphs of FIGS. 2A, 2B, and 2C, using output generated by the Latent Dirichlet allocation algorithm. The question content quality graph 330 includes an x-axis that provides a scale of predominantly tax-related question content on the left side of the graph (at "0.0") that extends to predominantly product-related question content on the right side of the graph (at "1.0"). The y-axis indicates a percentage of up votes. The closer a topic is to a tax-related question content, the higher (on average) the up vote percentages were. The capability of the probabilistic model to distinguish tax-related question content from product-related question content enables the question and answer customer support system 111 to route questions to the appropriate responding users so that a question can be adequately and efficiently addressed, according to one embodiment.

Returning to FIG. 1, the analytics module 115 uses the customer support content generator 130 to generate new customer support content 119 to provide guidance to a responding user while the user is creating/generating the response content 121 that is associated with the question content 120, according to one embodiment. As described above, the guidance can include one or more user interface elements 133 and/or phrases 135 that include recommendations and/or suggestions for improving the likelihood for user satisfaction of an answer to a question, and may include question quality indicators and/or question popularity indicators to motivate the question answer to compile high-quality and popular response content 121, according to one embodiment.

The analytics module 115 uses the customer support content generator 130 to generate new customer support content 119 to customize the navigation of and search results displayed in the user experience display for the user interface 117, to assist the searching user in efficiently finding existing submission content 123 that is relevant to the search query content 122, according to one embodiment. The analytics module 115 receives the search query content 122 and applies the probabilistic topic model 125 to determine the dominant topics, e.g., highest ranked of the submission content topics 128, of the search query content 122. The analytics module 115 applies the probabilistic topic model 125 to the existing submission content 123 of the customer support content database 116 to determine the topics and frequencies of topics of the existing submission content 123, according to one embodiment. The analytics module 115 is configured to sort the model output 127 for the existing submission content 123 in an order that is based on the dominant topics of the search query content 122, according to one embodiment. In one embodiment, the new customer support content 119 and the submission content topics 128 are ranked by relevance to the search query content 122 in a navigation bar of a webpage or web interface and/or as search results in a webpage or web interface, in response to receipt of the search query content 122 from a searching user, according to one embodiment.

Figure 4B:
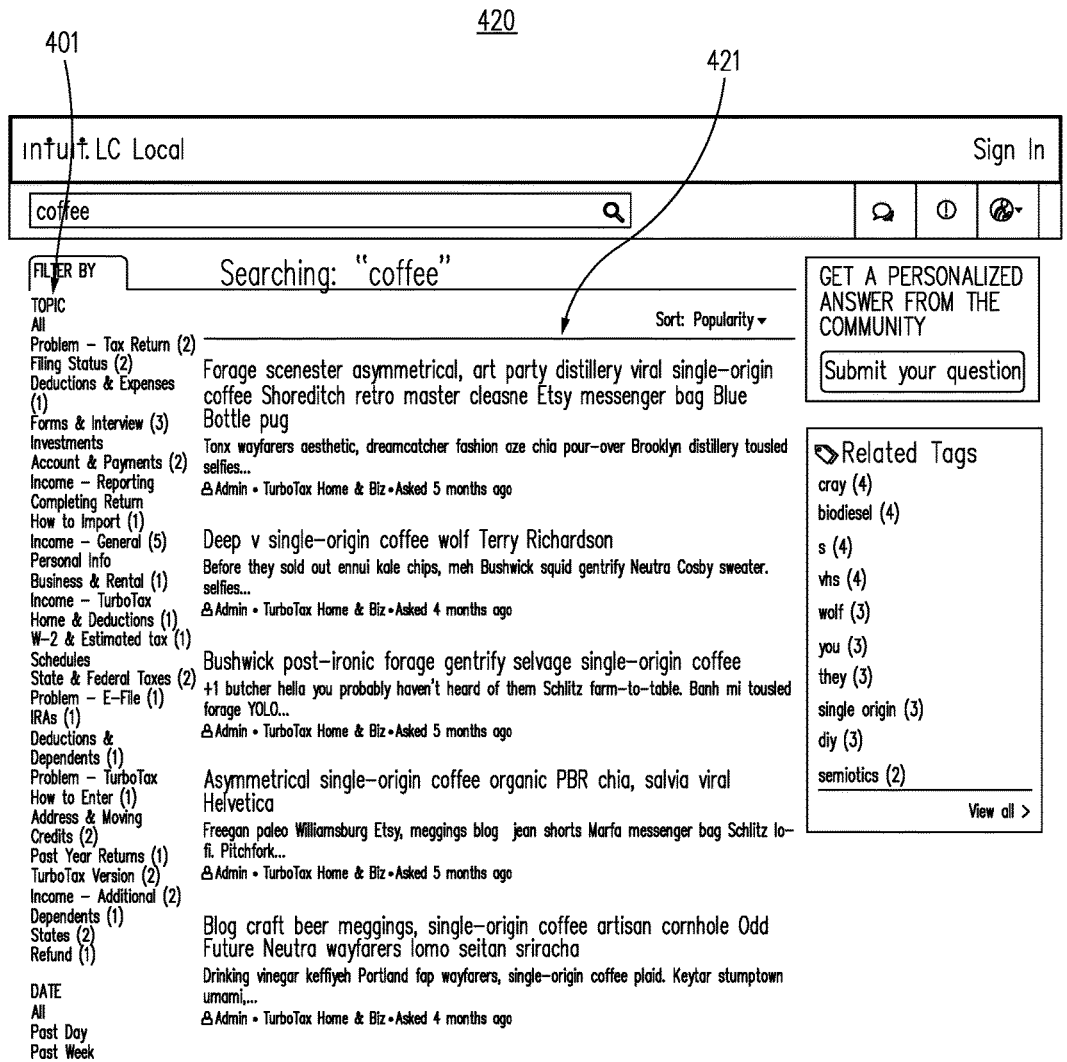

FIGS. 4A and 4B illustrate example user experience displays 400 and 420 that have topics and search results that are sorted based on the application of the Latent Dirichlet allocation algorithm to a data set of at least part of a question and answer database (i.e., an example embodiment of the existing submission content 123) and to a searching user's search query (i.e., an example embodiment of the search query content 122), according to one embodiment. The user experience display 400 includes a navigation bar 401 that provides a sorted list of topics that are related to a search query received from a searching user, according to one embodiment. The sorted list of the navigation bar 401 can be sorted/ranked in order based on the popularity of the topics, based on the quality of the products, and/or based on the relevance of the topics to the search query submitted by the searching user. The user experience display 420 includes search results 421 that are generated and/or sorted based on the application of the Latent Dirichlet allocation algorithm to at least part of the question and answer database, and to search query content submitted by the searching user. The search results 421 are sorted based on popularity, quality, and/or relevance to the search query submitted by the searching user, according to various embodiments.

Returning to FIG. 1, the question and answer customer support system 111 can use the analytics module 115 to apply the probabilistic topic model 125 to the customer support content database 116 to provide quality control analyses of the customer support content database 116. For example, the analytics module 115 can use the probabilistic topic model 125 to search the existing submission content 123 for redundant entries, for entries that are likely to be low quality, for entries that are likely to the unpopular, and can be configured to remove low-quality, unpopular, and/or redundant entries from the existing submission content 123. By performing quality control analyses of the customer support content database 116, the question and answer customer support system 111 increases the likelihood that searching users will find content that is high-quality, popular, and/or relevant to the search query content 122 submitted by the searching user, according to one embodiment.

Applying probabilistic topic models to submission content in the question and answer customer support system 111 can provide a number of benefits to the question and answer customer support system 111, according to one embodiment. The probabilistic topic model 125 is scalable and can be applied to customer support systems that are associated with the one or more additional service provider systems 113, i.e., software systems other than the tax return preparation system 112. The probabilistic topic model 125 can be operated "unsupervised". In other words, the probabilistic topic model 125 can be used without being trained by confirmed or known data sets. This benefit enables providing question and answer customer support services using less processing power, fewer computing cycles, and less computing system bandwidth than traditional techniques for providing question and answer customer support services, according to one embodiment. The probabilistic topic model 125 can be used to determine whether the content type of submission content is predominantly tax-related or predominantly product-related so that the submission content can be routed to the appropriate responding users or responding user group, and to enable the submission content to be correctly identified in the customer support content database 116, to facilitate the delivery of efficient and accurate search results to searching users, according to one embodiment. The probabilistic topic model 125 can be used to improve user interactions with the question and answer customer support system 111 by, assisting a user in improving question content 120, assisting a user to improve response content 121, and customizing search results to the search query content 122, among other benefits, according to one embodiment.

Process

Figure 5:
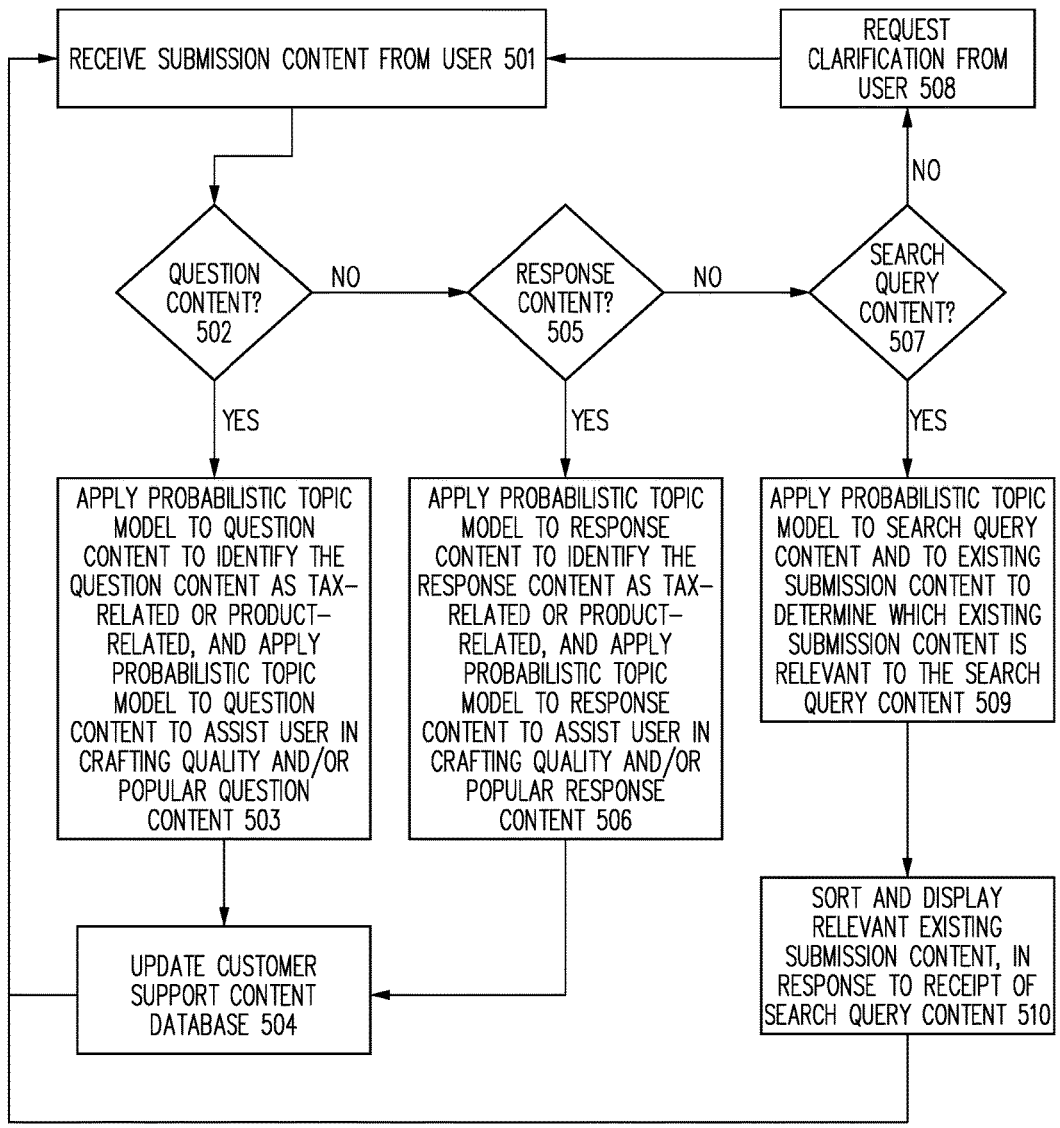
FIG. 5 is a flow diagram of a method for applying probabilistic topic models to content in a tax environment in accordance with one embodiment.

FIG. 5 is a flow diagram of a process 500 for applying probabilistic topic models to content in a tax environment to improve user satisfaction with a question and answer customer support system, in accordance with one embodiment.

At operation 501, the process receives submission content from a user, according to one embodiment. The user can be an asking user, a responding user, or a searching user, according to various embodiments. The submission content can include question content, response content, or search query content, according to various embodiments. The process proceeds to operation 502, according to one embodiment.

At operation 502, the process determines if the submission content is question content, according to one embodiment. If the submission content is question content, the process proceeds to operation 503, and if the submission content is not question content, the process proceeds to operation 505, according to one embodiment.

At operation 503, the process applies a probabilistic topic model to the question content to identify the question content as tax-related or product-related, and applies the probabilistic topic model to the question content to assist a user in crafting quality and/or popular question content, according to one embodiment. Based on the output of the probabilistic topic model, the process provides recommendations, question quality indicators, and/or question popularity indicators, to assist the user in improving the question content, according to one embodiment. The process proceeds to operation 504, according to one embodiment.

At operation 504, the process updates a customer support content database, according to one embodiment. The process returns to operation 501, according to one embodiment.

At operation 505, the process determines if the submission content is response content, according to one embodiment. If the submission content is response content, the process proceeds to operation 506, and if the submission content is not response content, the process proceeds to operation 507, wherein to one embodiment.

At operation 506, the process applies probabilistic topic model to response content to identify the response content as tax-related or product-related, and applies a probabilistic topic model to response content to assist the user in crafting quality and/or popular response content, according to one embodiment. Based on the output of the probabilistic topic model, the process provides recommendations, response quality indicators, and/or response popularity indicators, to assist the user in improving the response content, according to one embodiment. The process proceeds to operation 504, according to one embodiment.

At operation 507, the process determines if the submission content is search query content, according to one embodiment. If the submission content is not search query content, the process proceeds to operation 508, and if the submission content is search query content, the process proceeds to operation 509, according to one embodiment.

At operation 508, the process request clarification from a user, according to one embodiment. The process returns to operation 501, according to one embodiment.

At operation 509, the process applies a probabilistic topic model to search query content and to existing submission content to determine which existing submission content is relevant to the search query content, according to one embodiment. The process proceeds to operation 510, according to one embodiment.

At operation 510, the process sorts and displays relevant existing submission content, in response to receipt of the search query content, according to one embodiment. The process proceeds to operation 501, according to one embodiment.

Figure 6:
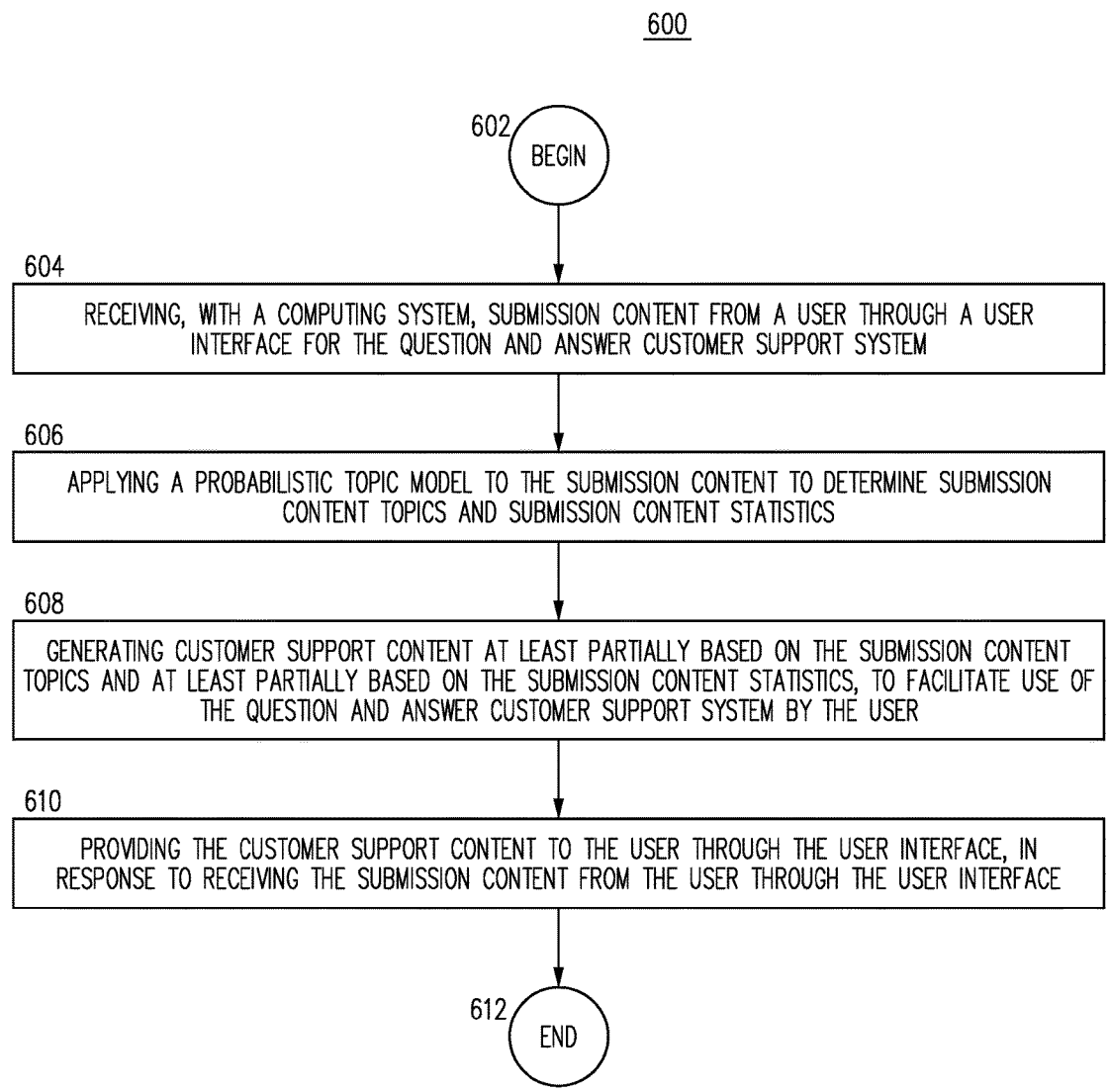
FIG. 6 is a flow diagram of a method for applying probabilistic topic models to content in a tax environment in accordance with one embodiment.

FIG. 6 is a flow diagram of a method for applying probabilistic topic models to content in a tax environment to improve user satisfaction with a question and answer customer support system, in accordance with one embodiment.

At operation 602, the process begins.

At operation 604, the process includes receiving, with a computing system, submission content from a user through a user interface for the question and answer customer support system, according to one embodiment.

At operation 606, the process includes applying a probabilistic topic model to the submission content to determine submission content topics and submission content statistics, according to one embodiment.

At operation 608, the process includes generating customer support content at least partially based on the submission content topics and at least partially based on the submission content statistics, to facilitate use of the question and answer customer support system by the user, according to one embodiment.

At operation 610, the process includes providing the customer support content to the user through the user interface, in response to receiving the submission content from the user through the user interface, according to one embodiment.

At operation 612, the process ends.

In accordance with an embodiment, a computer-implemented method applies probabilistic topic models to content in a tax environment to improve user satisfaction with a question and answer customer support system. The method includes receiving, with a computing system, submission content from a user through a user interface for the question and answer customer support system, according to one embodiment. The method includes applying a probabilistic topic model to the submission content to determine submission content topics and submission content statistics, according to one embodiment. The method includes generating customer support content at least partially based on the submission content topics and at least partially based on the submission content statistics, to facilitate use of the question and answer customer support system by the user, according to one embodiment. The method includes providing the customer support content to the user through the user interface, in response to receiving the submission content from the user through the user interface, according to one embodiment.

In accordance with an embodiment, a non-transitory computer-readable medium has instructions which, when executed by one or more computer processors, perform a method for applying probabilistic topic models to content in a tax environment to improve user satisfaction with a question and answer customer support system. The instructions include a customer support content database configured to maintain existing submission content to support operations for a question and answer customer support system, according to one embodiment. The instructions include an analytics module configured to apply a probabilistic topic model to new submission content to generate new customer support content, according to one embodiment. The new customer support content is at least partially based on submission content topics and submission content topics statistics that are generated by the probabilistic topic model from the new submission content, according to one embodiment. The instructions include a customer support engine configured to receive new submission content from a user, to update the existing submission content in the customer support content database with the new submission content, to provide the new submission content to the analytics module, and to receive customer support content from the analytics module that is at least partially based on the new submission content provided to the analytics module, according to one embodiment.

In accordance with an embodiment, a system applies probabilistic topic models to content in a tax environment to improve user satisfaction with a question and answer customer support system, according to one embodiment. The system includes at least one processor, and at least one memory coupled to the at least one processor, according to one embodiment. The at least one memory stores instructions which, when executed by any set of the one or more processors, perform a process for applying probabilistic topic models to content in a tax environment, according to one embodiment. The process includes receiving, with a computing system, submission content from a user through a user interface for the question and answer customer support system, according to one embodiment. The process includes applying a probabilistic topic model to the submission content to determine submission content topics and submission content statistics, according to one embodiment. The process includes generating customer support content at least partially based on the submission content topics and at least partially based on the submission content statistics, to facilitate use of the question and answer customer support system by the user, according to one embodiment. The process includes providing the customer support content to the user through the user interface, in response to receiving the submission content from the user through the user interface.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computer-implemented method for applying probabilistic topic models to content in a tax environment to improve user satisfaction with a question and answer customer support system, the method comprising:

receiving, with a computing system, submission content from a user through a user interface for the question and answer customer support system;

applying, in real-time while portions of the submission content are being received, a probabilistic topic model to the submission content to determine submission content topics and submission content statistics;

generating customer support content at least partially based on the submission content topics and at least partially based on the submission content statistics, to facilitate use of the question and answer customer support system by the user, the generated customer support content including recommendations for modifying question content that is received in the submission content and recommendations for modifying answer content that is received in the submission content; and providing the customer support content to the user through the user interface, in response to receiving the submission content from the user through the user interface, the provided customer support content including populated new customer support content including real-time recommendations for improving the quality and/or the popularity of the question content, the populated content further including a real-time question quality indicator and a real-time question popularity indicator.

2. The method of claim 1, wherein the probabilistic topic model includes a Latent Dirichlet allocation algorithm.

3. The method of claim 1, wherein the submission content includes content selected from a group consisting of:
- question content from an asking user,
- response content from a responding user, and
- query content from a searching user.

4. The method of claim 1, wherein the submission content topics are discrete portions of the submission content that provide quantifiable summaries of the submission content.

5. The method of claim 1, wherein the customer support content includes content selected from a group consisting of:
- indicators for strength of question content that is received in the submission content;
- indicators for strength of response content that is received in the submission content; and
- search results for query content that is received in the submission content.

6. The method of claim 1, wherein applying the probabilistic topic model includes applying the probabilistic topic model to the submission content to determine submission content topics and submission content statistics, without training the probabilistic topic model with existing content from the question and answer customer support system.

7. The method of claim 1, wherein the submission content topics include individual terms that are discrete portions of the submission content, wherein each of the terms are unique to each of other ones of the terms.

8. The method of claim 7, wherein each term is an individual word.

9. The method of claim 1, further comprising:
- categorizing the submission content as product-related content or tax-related content, at least partially based on one or more of the submission content topics and the submission content statistics; and
- identifying the submission content as product-related content or tax-related content.

10. The method of claim 9, further comprising:
- updating a question and answer customer support database to include the submission content that has been identified as product-related content or tax-related content,
    - wherein updating the question and answer customer support database includes associating a product-related content identifier or a tax-related content identifier with the submission content, in the question and answer customer support database.

11. The method of claim 9, further comprising:
- if the submission content is identified as product-related content, routing the submission content to a first responding user to generate response content for the submission content; and
- if the submission content is identified as tax-related content, routing the submission content to a second responding user to generate the response content for the submission content.

12. The method of claim 11, wherein the first responding user is a customer service representative for the question and answer customer support system.

13. The method of claim 1, wherein the submission content includes query content from a searching user, the method further comprising:
- determining, with the probabilistic topic model, whether the query content is more relevant to product-related content or tax-related content; and
- searching product-related content or tax-related content in a question and answer customer support database for response content that satisfies search criteria of the query content, to increase a likelihood of returning relevant response criteria in response to the query content.

14. The method of claim 1, wherein the submission content includes query content from a searching user, the method further comprising:
- determining existing submission content topics of existing submission content, at least partially based on the probabilistic topic model;
- determining relevant ones of the existing submission content topics; and
- providing weblinks to the relevant ones of the existing submission content topics, to improve relevant navigation of search results for the user.

15. The method of claim 14, wherein the weblinks of the relevant ones of the existing submission content topics are sorted by at least one of: popularity, quality, and relevance to the query content.

16. The method of claim 1, further comprising:
- applying the probabilistic topic model to content of a question and answer customer support database to determine submission content topics for existing submission content in the question and answer customer support database; and
- correcting mis-categorized submission content topics for the existing submission content, at least partially based on model output from the probabilistic topic model, to improve an accuracy of queries to the question and answer customer support database.

17. The method of claim 1, further comprising:
- applying the probabilistic topic model to content of a question and answer customer support database to determine submission content topics for existing submission content in the question and answer customer support database; and
- removing portions of the existing submission content, at least partially based on model output from the probabilistic topic model, to improve user satisfaction with queries to the question and answer customer support database,
    - wherein the portions of the existing submission content include one or more of low-quality content, low-popularity content, and redundant content.

18. A non-transitory computer-readable medium having instructions which, when executed by one or more computer processors, perform a method for applying probabilistic topic models to content in a tax environment to improve user satisfaction with a question and answer customer support system, the instructions including:
- a customer support content database configured to maintain existing submission content to support operations for a question and answer customer support system;
- an analytics module configured to apply, in real-time while portions of the submission content are being received, a probabilistic topic model to new submission content to generate new customer support content, the generated customer support content including recommendations for modifying question content that is received in the submission content and recommendations for modifying answer content that is received in the submission content,
    - wherein the new customer support content is at least partially based on submission content topics and submission content topics statistics that are generated by the probabilistic topic model from the new submission content; and a customer support engine configured to receive new submission content from a user, to update the existing submission content in the customer support content database with the new submission content, to provide the new submission content to the analytics module, and to receive customer support content from the analytics module that is at least partially based on the new submission content provided to the analytics module, the received customer support content including populated new customer support content including real-time recommendations for improving the quality and/or the popularity of the question content, the populated content further including a real-time question quality indicator and a real-time question popularity indicator.

19. The computer-readable medium of claim 18, wherein the probabilistic topic model includes a Latent Dirichlet allocation algorithm.

20. The computer-readable medium of claim 18, wherein the new submission content includes content selected from a group consisting of:
   question content from an asking user,
   response content from a responding user, and
   query content from a searching user.

21. The computer-readable medium of claim 18, wherein the submission content topics are discrete portions of the new submission content that provide quantifiable summaries of the submission content.

22. The computer-readable medium of claim 18, wherein the new customer support content includes content selected from a group consisting of:
   indicators for strength of question content that is received in the submission content;
   indicators for strength of response content that is received in the submission content; and
   search results for query content that is received in the submission content.

23. The computer-readable medium of claim 18, wherein the analytics module is configured to categorized the new submission content as product-related content or tax-related content, at least partially based on one or more of the submission content topics and the submission content statistics, and to tag the new submission content as product-related content or tax-related content for identification in the customer support content database.

24. A system for applying probabilistic topic models to content in a tax environment to improve user satisfaction with a question and answer customer support system, the system comprising:
   at least one processor; and
   at least one memory coupled to the at least one processor, the at least one memory having stored therein instructions which, when executed by any set of the one or more processors, perform a process for applying probabilistic topic models to content in a tax environment, the process including:
   receiving, with a computing system, submission content from a user through a user interface for the question and answer customer support system;
   applying, in real-time while portions of the submission content are being received, a probabilistic topic model to the submission content to determine submission content topics and submission content statistics;
   generating customer support content at least partially based on the submission content topics and at least partially based on the submission content statistics, to facilitate use of the question and answer customer support system by the user, the generated customer support content including recommendations for modifying question content that is received in the submission content and recommendations for modifying answer content that is received in the submission content; and
   providing the customer support content to the user through the user interface, in response to receiving the submission content from the user through the user interface, the provided customer support content including populated new customer support content including real-time recommendations for improving the quality and/or the popularity of the question content, the populated content further including a real-time question quality indicator and a real-time question popularity indicator.

25. The system of claim 24, wherein the probabilistic topic model includes a Latent Dirichlet allocation algorithm.

26. The system of claim 24, wherein the submission content includes content selected from a group consisting of:
   question content from an asking user,
   response content from a responding user, and
   query content from a searching user.

27. The system of claim 24, wherein the submission content topics are discrete portions of the submission content that provide quantifiable summaries of the submission content.

28. The system of claim 24, wherein the customer support content includes content selected from a group consisting of:
   indicators for strength of question content that is received in the submission content;
   indicators for strength of response content that is received in the submission content; and
   search results for query content that is received in the submission content.

29. The system of claim 24, wherein applying the probabilistic topic model includes applying the probabilistic topic model to the submission content to determine submission content topics and submission content statistics, without training the probabilistic topic model with existing content from the question and answer customer support system.

30. The system of claim 24, wherein the submission content topics include individual terms that are discrete portions of the submission content, wherein each of the terms are unique to each of other ones of the terms.

31. The system of claim 30, wherein each term is an individual word.

32. The system of claim 24, wherein the process further comprises:
   categorizing the submission content as product-related content or tax-related content, at least partially based on one or more of the submission content topics and the submission content statistics; and
   identifying the submission content as product-related content or tax-related content.

33. The system of claim 32, wherein the process further comprises:
   updating a question and answer customer support database to include the submission content that has been identified as product-related content or tax-related content,
      wherein updating the question and answer customer support database includes associating a product-related content identifier or a tax-related content identifier with the submission content, in the question and answer customer support database.

34. The system of claim 32, wherein the process further comprises:
- if the submission content is identified as product-related content, routing the submission content to a first responding user to generate response content for the submission content; and
- if the submission content is identified as tax-related content, routing the submission content to a second responding user to generate the response content for the submission content.

35. The system of claim 34, wherein the first responding user is a customer service representative for the question and answer customer support system.

36. The system of claim 24, wherein the submission content includes query content from a searching user, wherein the process further comprises:
- determining, with the probabilistic topic model, whether the query content is more relevant to product-related content or tax-related content; and
- searching product-related content or tax-related content in a question and answer customer support database for response content that satisfies search criteria of the query content, to increase a likelihood of returning relevant response criteria in response to the query content.

37. The system of claim 24, wherein the submission content includes query content from a searching user, wherein the process further comprises:
- determining existing submission content topics of existing submission content, at least partially based on the probabilistic topic model;
- determining relevant ones of the existing submission content topics; and
- providing weblinks to the relevant ones of the existing submission content topics, to improve relevant navigation of search results for the user.

38. The system of claim 37, wherein the weblinks of the relevant ones of the existing submission content topics are sorted by at least one of: popularity, quality, and relevance to the query content.

39. The system of claim 24, wherein the process further comprises:
- applying the probabilistic topic model to content of a question and answer customer support database to determine submission content topics for existing submission content in the question and answer customer support database; and
- correcting mis-categorized submission content topics for the existing submission content, at least partially based on model output from the probabilistic topic model, to improve an accuracy of queries to the question and answer customer support database.

40. The system of claim 24, wherein the process further comprises:
- applying the probabilistic topic model to content of a question and answer customer support database to determine submission content topics for existing submission content in the question and answer customer support database; and
- removing portions of the existing submission content, at least partially based on model output from the probabilistic topic model, to improve user satisfaction with queries to the question and answer customer support database,
  - wherein the portions of the existing submission content include one or more of low-quality content, low-popularity content, and redundant content.

* * * * *